United States Patent
Yokomizo

(10) Patent No.: US 7,299,889 B2
(45) Date of Patent: Nov. 27, 2007

(54) SEAT SUPPORTING STRUCTURE IN MOTORCYCLE

(75) Inventor: Shin Yokomizo, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 202 days.

(21) Appl. No.: 10/514,951

(22) PCT Filed: Jun. 9, 2003

(86) PCT No.: PCT/JP03/07306

§ 371 (c)(1),
(2), (4) Date: Nov. 18, 2004

(87) PCT Pub. No.: WO03/104068

PCT Pub. Date: Dec. 18, 2003

(65) Prior Publication Data

US 2006/0061157 A1    Mar. 23, 2006

(30) Foreign Application Priority Data

Jun. 10, 2002   (JP)   ............................. 2002-168624

(51) Int. Cl.
*B62J 1/00*   (2006.01)
(52) U.S. Cl. .................................... 180/219; 297/195.1
(58) Field of Classification Search ................ 180/219; 297/195.1, 197, 201; 280/288.4
See application file for complete search history.

(56) References Cited

U.S. PATENT DOCUMENTS 4,103,966 A * 8/1978 Allen ...................... 297/195.1

4,457,524 A * 7/1984 Yoshiwara .................. 280/835

(Continued)

FOREIGN PATENT DOCUMENTS

JP    62-88679    4/1987

(Continued)

*Primary Examiner*—Tony Winner
(74) *Attorney, Agent, or Firm*—Hogan & Hartson LLP

(57) ABSTRACT

Engaging pieces (35) for receiving a load are provided in sections of a rear frame (26) corresponding to both ends of a seat (9) in a width direction of a vehicle so as to project upward. Movably supported plates (61), which are movably supported by the engaging pieces (35), are formed at both ends of a bottom plate (51) of the seat (9) in the width direction of the vehicle, which are sections opposed to the engaging pieces (35). These movably supported plates 61 are positioned above the other sections of the bottom plate (51). Inner cushion materials (53, 54) harder than a cushion material (52) on a seat surface side are provided between these movably supported plates (61). The bottom plate (51) of the seat (9) is movably supported by the projecting pieces (35) at both the ends thereof and is never displaced in a height direction. When a weight of a rider is applied to the seat (9) as an impact load, a section between both the ends is elastically deformed to curve downward viewed from a front-rear direction of the vehicle, and an amount of downward deformation of the bottom plate (51) can be reduced. When the rider is seated, the rider sits on the inner cushion materials (53, 54) via the cushion material (52) on a seat surface side, and an impact, which cannot be eased by the cushion material (52) on the seat surface side, is eased by the inner cushion materials (53, 54).

20 Claims, 12 Drawing Sheets

U.S. PATENT DOCUMENTS

| | | | |
|---|---|---|---|
| 4,712,637 A * | 12/1987 | Mogi et al. | 180/219 |
| 4,796,901 A * | 1/1989 | Furukawa | 280/835 |
| 6,273,207 B1 * | 8/2001 | Brown | 180/219 |
| 7,028,800 B2 * | 4/2006 | Yagisawa et al. | 180/219 |

FOREIGN PATENT DOCUMENTS

| | | |
|---|---|---|
| JP | 62-83796 | 5/1987 |
| JP | 08-104270 | 4/1996 |

* cited by examiner

SEAT SUPPORTING STRUCTURE IN MOTORCYCLE

BACKGROUND OF THE INVENTION

1. Technical Field

The present invention relates to a seat supporting structure in a saddle riding type vehicle in which both ends in a vehicle width direction of a seat are movably supported by a rear frame of a body frame.

2. Background Art

Conventionally, a seat of a motorcycle, which is an example of a saddle riding type vehicle, adopts a structure in which a cushion material consisting of urethane foam or the like is placed on a bottom plate of plastics and the cushion material is covered with a skin. In order to fix this seat to a body frame of the motorcycle, a front end of the bottom plate in a front-rear direction (longitudinal direction) of the vehicle is engaged with the rear of a fuel tank and the rear end of the bottom plate is fastened by bolts. In addition, in the center of the seat in the front-rear direction of the vehicle, a leg, which is integrally formed to protrude downward from the bottom plate, is movably supported by the rear frame, such that the body frame can support the weight of a rider.

On the other hand, as a motorcycle, there is a so-called motocrosser for competing for speed of running off-roads. A two-cycle engine is often used in this type of motorcycle in order to reduce the weight of the vehicle. In the motocrosser mounted with the two-cycle engine, a kick type starter is used and a starter motor is not used.

The inventors consider mounting a four-cycle engine on the motocrosser and equipping the motocrosser with the starter motor.

Here, in equipping the motocrosser with the starter motor, it is preferable to mount a battery for supplying power to the starter motor below the seat. However, this causes a problem in that a bottom plate of the seat hits the battery when the seat bends downward largely.

The bottom plate of the seat bends largely, for example, when the vehicle jumps and makes landing and the weight of the rider is applied to the seat as an impact load. In other words, a large load is applied to the seat, whereby a leg protrudingly provided on the bottom plate inclines to topple to the inside of the vehicle, and the center of the bottom plate in a width direction of the vehicle curves downward viewed from the front-rear direction. Thus, the bottom plate bends downward largely.

Note that, since the battery is a heavy object, a mounting position of the battery is restricted in bringing a center of gravity of the vehicle close to an ideal position. For example, it is difficult to mount the battery in a section other than a section below the seat, and it is not easy to mount the battery in a lower position because it is likely that the battery interferes with other components located below the seat.

The deficiency can be eliminated if a position of the seat is set high or the bottom plate is formed of metal, for example, such that the seat does not bend easily. However, if the seat is set in a higher position, a seating position of a rider becomes higher and a center of gravity at a time of riding becomes higher. The rider is given a sense of incongruity if the seat does not bend at all. In addition, the deficiency can be eliminated if the seat is formed to be reduced in thickness so as to separate the bottom plate upward from the battery. However, when this structure is adopted, since a cushion material is reduced in thickness, the rider is given a feeling unpleasant when the buttocks of the rider hit the bottom plate via the cushion material when the rider is seated.

SUMMARY OF THE INVENTION

The invention has been devised in view of the circumstances described above, and it is an advantage of the invention to provide a seat supporting structure in a saddle type vehicle with which a seat bends less easily while comfort in seating is prevented from being deteriorated.

The seat supporting structure in a saddle type vehicle according to an embodiment of the invention is a seat supporting structure in which a seat extending in a front-rear direction of a vehicle is provided. Projecting pieces for receiving a load are provided in sections of a rear frame, which correspond to both ends of the seat in a width direction of the vehicle of this seat, so as to project upward. A bottom plate of the seat includes a flat portion that constitutes a center of this bottom plate in the width direction of the vehicle and extends in the front-rear direction and movably supported plates that are formed at both ends of the bottom plate in the width direction of the vehicle. The plates are sections opposed to the projecting pieces, positioned above the flat portion, and movably supported by the projecting pieces. Vertical walls that connect ends of the flat portion in the width direction of the vehicle and ends on inner sides of the vehicle of the respective movably supported plates are also provided. An inner cushion material harder than a cushion material on a seat surface side is provided on the flat portion so as to be located between both the movably supported plates and between both the vertical walls.

According to the invention, the bottom plate of the seat is movably supported by the projecting pieces at both the ends thereof and is never displaced in a height direction. When the weight of the rider is applied to the seat as an impact load, a section between both the ends is elastically deformed to curve downward viewed from a front-rear direction of the vehicle. Therefore, although in the conventional seat supporting structure, the leg provided on the bottom plate is movably supported by the rear frame and the leg inclines due to the impact load, whereby the bottom plate itself is lowered, this does not occur according to the invention, and an amount of downward deformation of the bottom plate can be reduced.

In addition, for example, when the rider is seated to apply an impact load to the seat, the rider sits on the inner cushion materials via the cushion material on a seat surface side, and an impact, which cannot be eased by the cushion material on the seat surface side, is eased by the inner cushion materials. Consequently, despite the fact that the amount of deformation of the bottom plate of the seat is reduced and it becomes difficult to ease the impact with elasticity of the bottom plate, the rider is not given a feeling unpleasant when the rider hits the bottom plate of the seat when the rider is seated. Moreover, riding comfort is not damaged even if the seat is formed to have a reduced thickness.

Therefore, since it is possible to form the seat so as to bend less easily and have a reduced thickness while preventing seating comfort from being deteriorated, components such as a battery can be arranged in the vicinity below the seat without bringing the components and the seat into contact with each other.

According to an embodiment of the present invention, it is also possible that engaging pawls projecting toward the rear of the vehicle are provided at upper ends of the projecting pieces, and engaging pieces, which face lower parts of the engaging pawls and engage with the engaging pawls, are provided on the bottom plate of the seat.

According to the structure, when a force of pulling the seat sides upward is applied to the seat sides by the legs of the rider during running, it is possible to receive this force with the rear frame via engaging parts of the engaging pawls and the engaging pieces.

Consequently, since the seat can be fixed to the rear frame firmly, it is possible to form the seat so as to have a further reduced thickness and to form a large space below the seat.

According to an embodiment of the present invention, it is possible that the inner cushion materials are formed by stacking plural cushion materials different in hardness one on top of another in layers such that those closer to the bottom plate are relatively harder.

According to the structure, when an impact given to the seat by the rider sitting on the seat is relatively small, a larger amount of impact is damped by the cushion materials closer to the seat surface, and when the impact is relatively large, the impact is also damped by the cushion materials closer to the bottom plate of the seat. Consequently, since a damping force is generated in the seat so as to correspond to a magnitude of a force applied by the rider when he sits on the seat, it is possible to provide stable seating comfort.

DETAILED DESCRIPTION OF THE INVENTION

Figure 1:
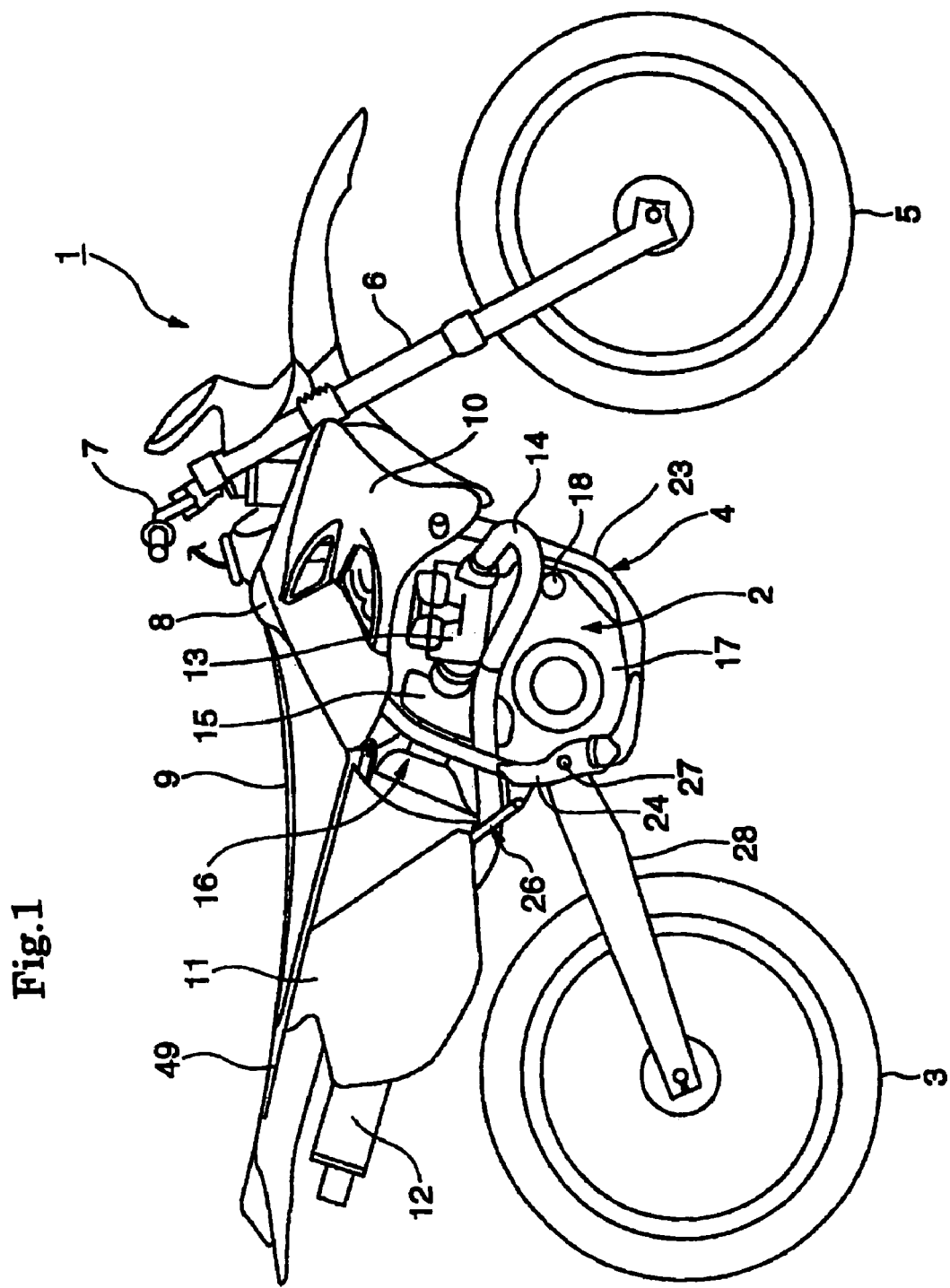
FIG. 1 is a side view of a motorcycle that adopts a seat supporting structure according to an embodiment of the present invention.

The invention will be explained in accordance with the attached drawings in order to describe the invention more in detail.

In the figures, reference numeral 1 denotes a motorcycle that is an example of a saddle riding type vehicle, and the left and right in the following description refers to a width direction of a vehicle when facing the front of the vehicle.

The motorcycle 1 is a so-called motocrosser and is mounted with a water-cooled four-cycle engine 2. The motorcycle 1 runs by driving a rear wheel 3 with this engine 2. In FIG. 1, reference numeral 4 denotes a body frame of a cradle type; 5, a front wheel; 6, a front fork; 7, a steering handlebar; 8, a fuel tank; 9, a seat; 10, a cowling; 11, a side cover; and 12, a muffler.

Figure 3:
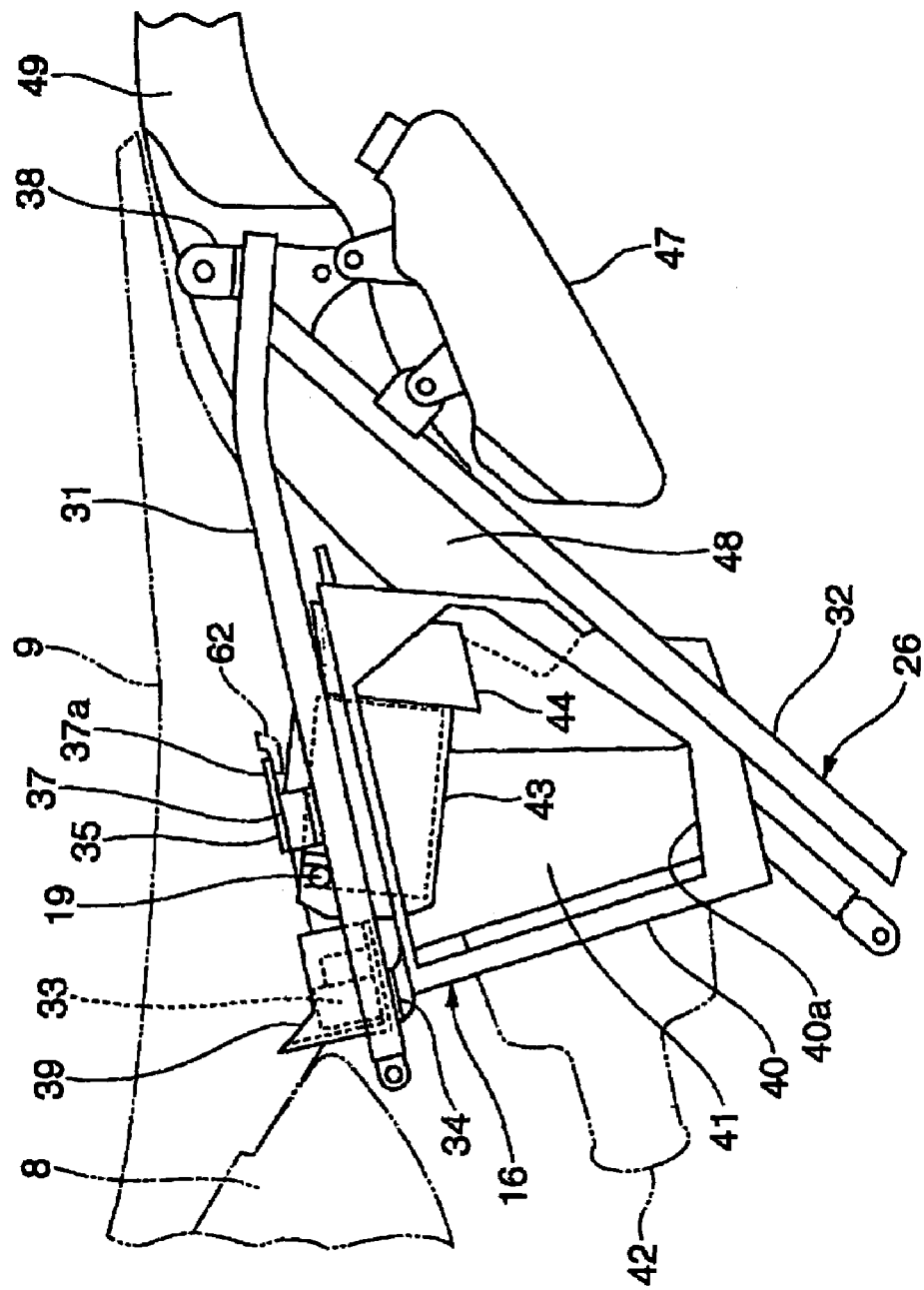
FIG. 3 is a side view of the rear frame.
Figure 4:
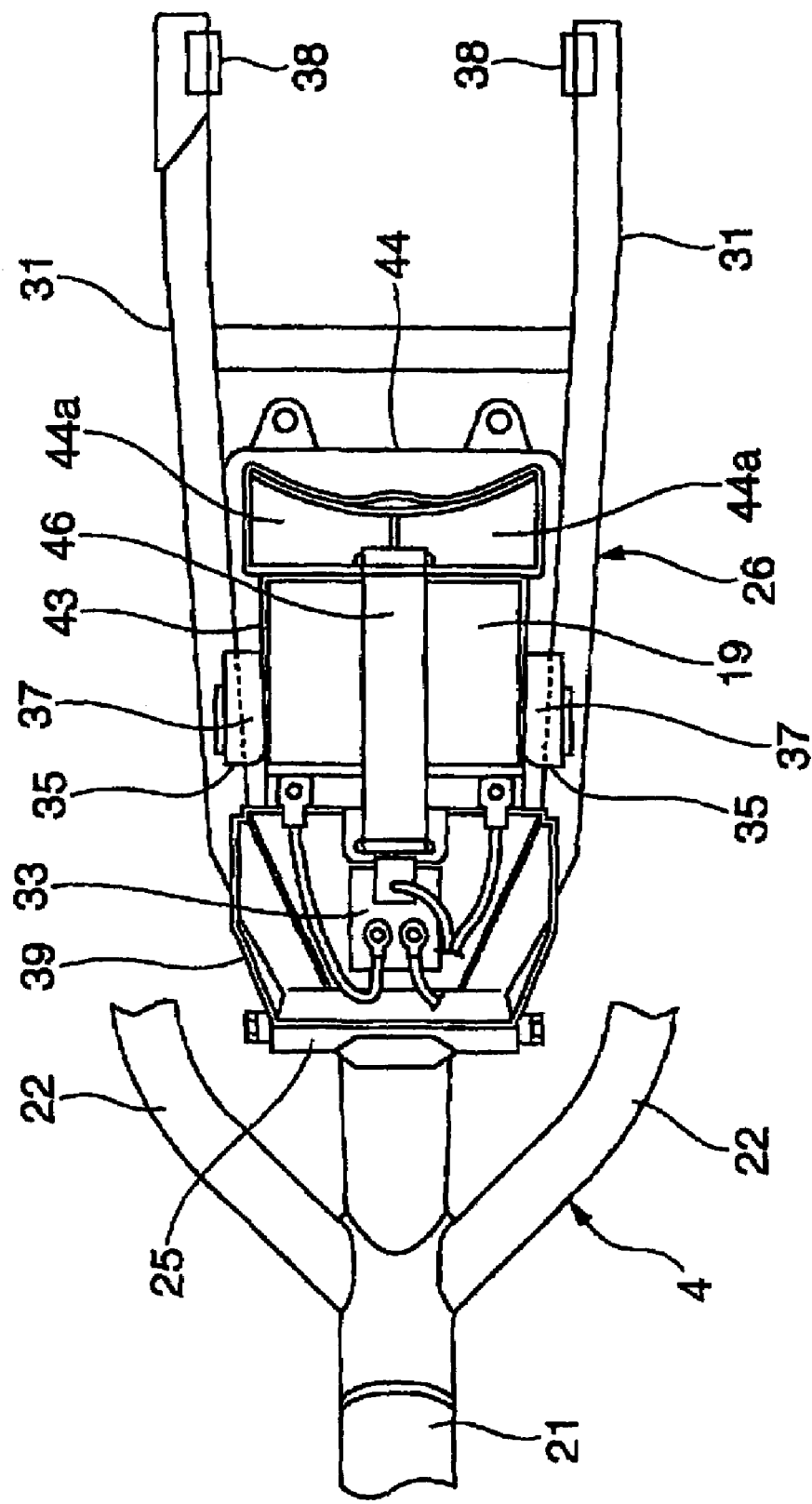
FIG. 4 is a plan view of the rear frame.
Figure 5:
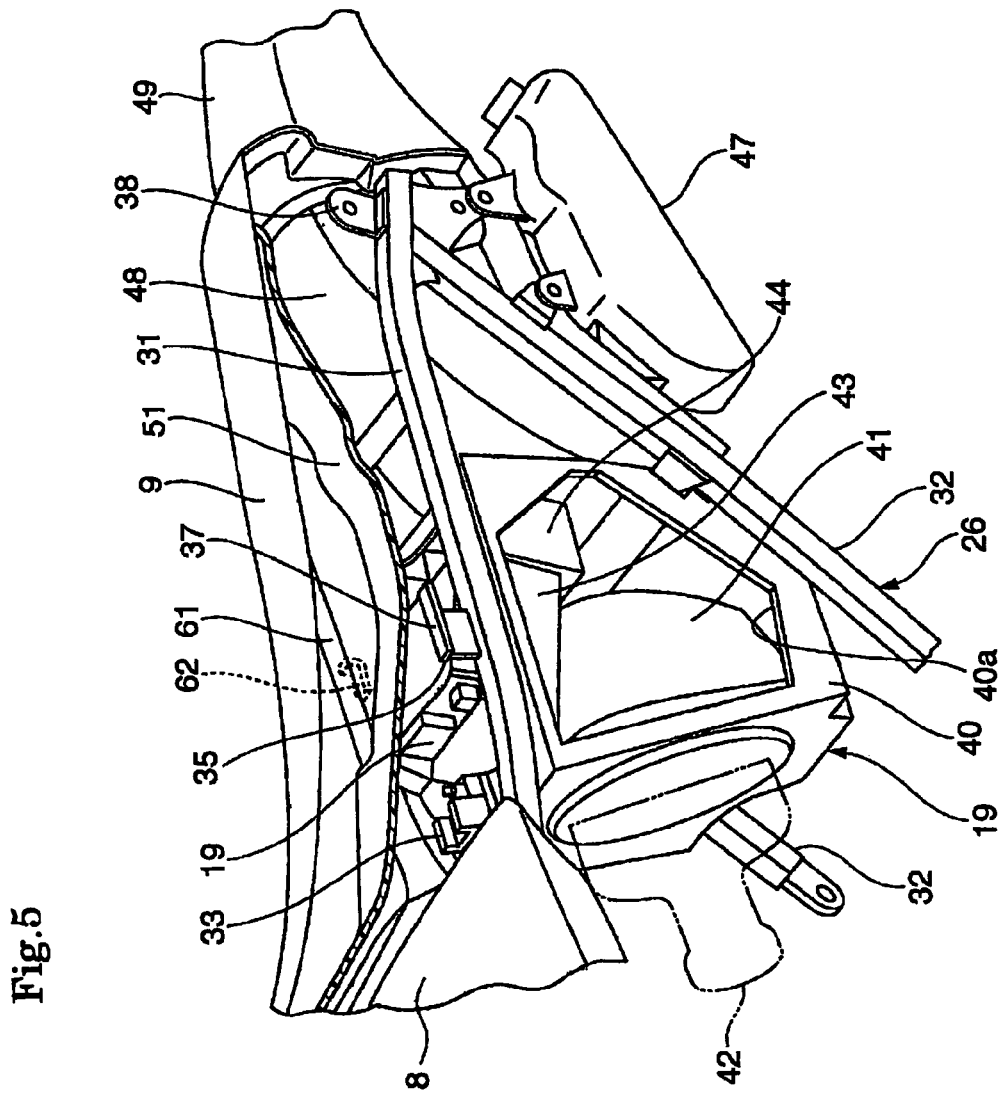
FIG. 5 is a perspective view showing a state in which an air cleaner box and a battery are attached to the rear frame.

In the engine 2, an exhaust pipe 14 is connected to a front part of a cylinder 13 in a front-rear direction (longitudinal direction) of the vehicle, and an intake system including a carburetor 15 and an air cleaner 16 is connected to a rear part of the cylinder 13. In addition, a crank case 17 of this engine 2 is equipped with a starter motor 18. As shown in FIGS. 3 to 5, electric power is supplied to this starter motor from a battery 19 disposed below the seat 9.

As is well known conventionally, the body frame 4 is formed by a head pipe (not shown) that pivotably supports the front fork 6, a main pipe 21 (see FIG. 4) that extends downward to the rear from an upper part of this head pipe above the engine 2, a pair of left and right seat pillar tubes 22 that are connected to a rear end of this main pipe 21, a pair of left and right down tubes 23 (see FIG. 1) that extend downward to the rear from a lower part of the head pipe, a rear arm bracket 24 that connects rear ends of this down tubes 23 and lower ends of the seat pillar tubes 22, and the like.

Figure 2:
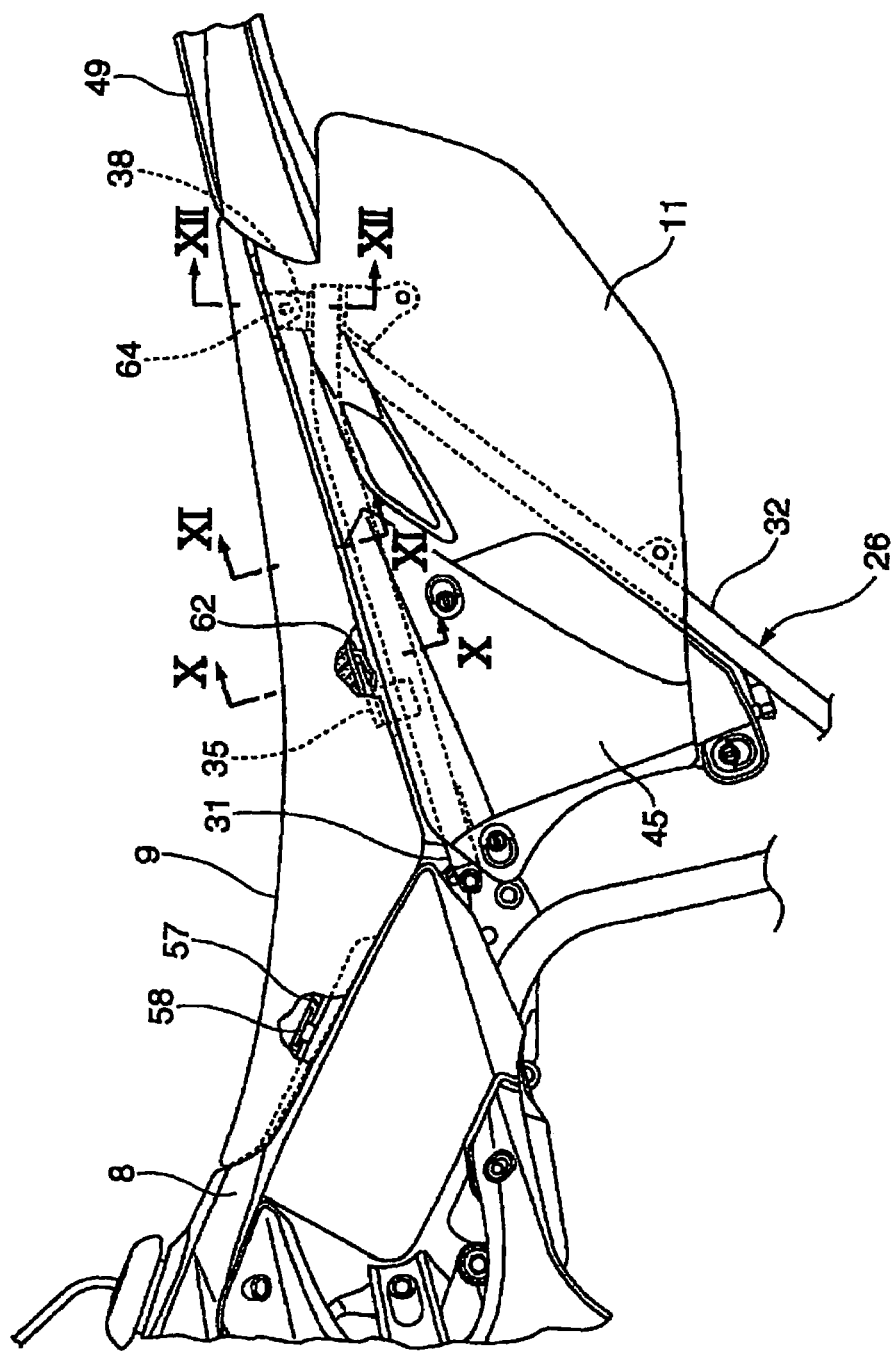
FIG. 2 is a side view showing a seat section in enlargement.

As shown in FIGS. 2 and 4, a rear frame 26 is attached to the rear end of the main pipe 21 via a bracket 25. In addition, a rear arm for rear wheel support 28 is swingably supported by the rear arm bracket 24 via a pivot shaft 27.

As shown in FIGS. 2, 3, 6, and 7, the rear frame 26 includes a pair of left and right seat rails 31 that extend upward to the rear from the bracket 25 and back stays 32 that connect rear ends of the seat rails 31 and the lower ends of the seat pillar tubes 22. The seat rails 31 and the back stays 32 are formed of a pipe of aluminum alloy having a square shape in section, respectively.

Figure 6:
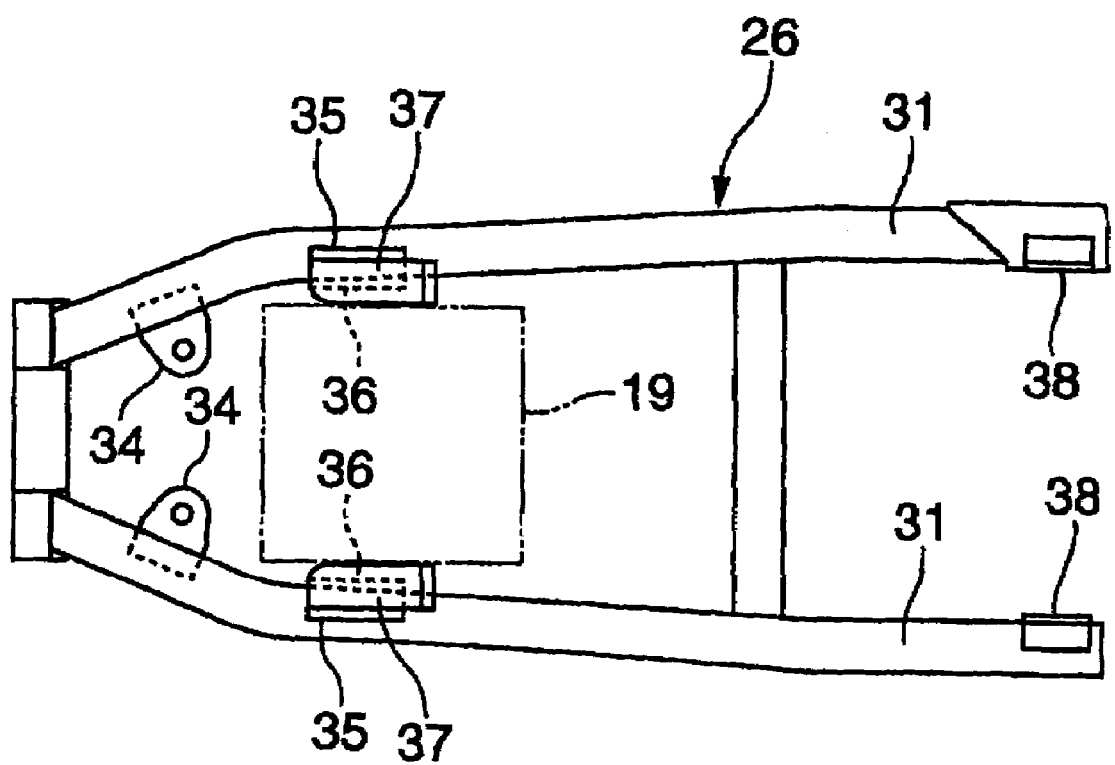
FIG. 6 is a plan view of the rear frame.
Figure 7:
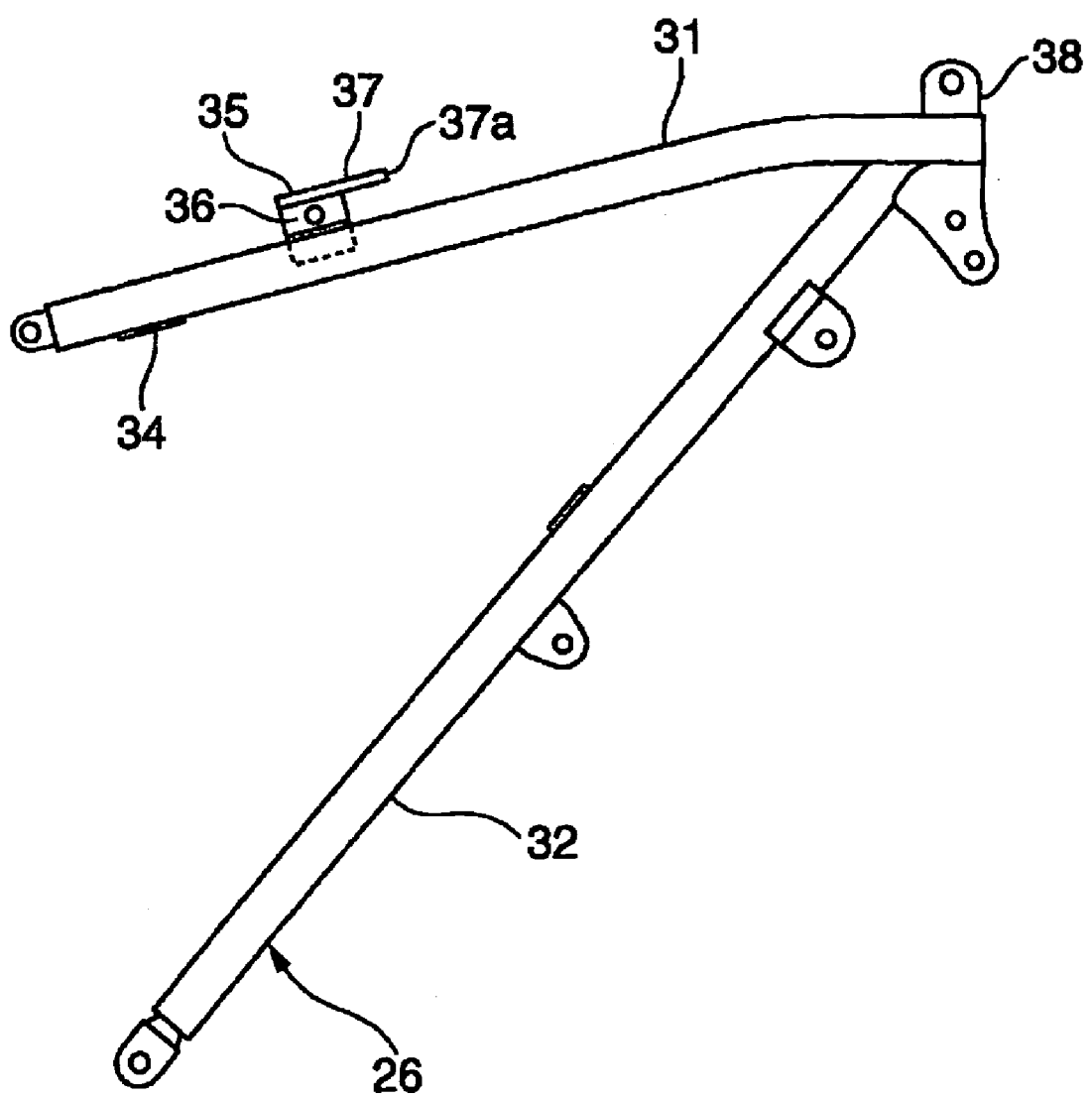
FIG. 7 is a side view of the rear frame.

As shown in FIGS. 6 and 7, tabular brackets 34 for supporting a relay for starter motor 33 and a front upper part of the air cleaner 16 are welded to front ends of the seat rails 31 so as to extend to the inner side of the vehicle. In addition, locking pieces 35 for receiving a load of the seat 9 to be described later are welded to the seat rails 31 in a middle part in the front-rear direction of the vehicle. Projecting pieces according to the invention include the locking pieces 35. As shown in FIG. 7, the locking pieces 35 are formed by vertical plates 36 extending upward from upper surfaces of the seat rails 31 and pressure receiving plates 37 extending from upper ends of these vertical plates 36 to the inner side of the vehicle and to the rear of the vehicle. Locking pawls according to an embodiment of the present invention include rear ends 37*a* projecting backward from the vertical plates 36 in these pressure receiving plates 37. In addition, brackets 38 for fixing the rear end of the seat 9 are welded to the rear ends of the seat rails 31 in such a manner that the brackets 38 project upward.

As shown in FIGS. 3 and 4, the relay for start motor 33 is surrounded by a cover for relay 39 on four sides excluding an upper side and a rear side. This cover is supported by the tabular brackets 34 together with the relay 39 and is formed such that, even when fuel flows down a rear wall of the fuel tank 8 when the fuel is filled, it is possible to prevent the fuel from adhering to the relay for starter motor 33.

The air cleaner 16 includes an air cleaner box 40 that is housed in a space formed between the seat rails 31 and the back stays 32 of the rear frame 26, an air cleaner element 41 that is provided inside this air cleaner box 40, and an air inlet duct 42 that connects the air cleaner box 40 to the carburetor 15.

The air cleaner box 40 is formed in a box shape by combining plural members, and an upper end thereof is fixed to the brackets 34 in a state in which a lower part thereof is supported by the backstays 32. On the upper end wall, among the plural members forming this air cleaner box 40, a box for battery support 43 and a duct for air intake 44 are formed integrally and arranged in the front-rear direction of the vehicle so as to recess the wall downward partially. An air intake of the duct for air intake 44 is denoted by reference sign 44a in FIG. 4. In addition, an opening for maintenance 40a (see FIGS. 3 and 5) is formed on a left wall of the air cleaner box 40. This opening for maintenance 40a is an opening for replacing and cleaning the air cleaner element 41 and is opened and closed by a cover denoted by reference numeral 45 in FIG. 2.

The box for battery support 43 is formed in a box shape opened upward, and the battery 19 is housed therein. In addition, a band 46 (see FIG. 4) for pressing the battery 19 from above is attached to an upper end of this box for battery support 43. The duct for air intake 44 is disposed on a back side of the box for battery support 43 and communicates with a space formed between the air cleaner box 40 and the seat 9 and the inside of the air cleaner box 40.

In FIGS. 3 and 5, a reservoir tank 47 for engine cooling water is attached to the rear end of the rear frame 26. Reference numeral 48 denotes a mud guard and 49 denotes a rear fender formed integrally with the mud guard 48.

Figure 8:
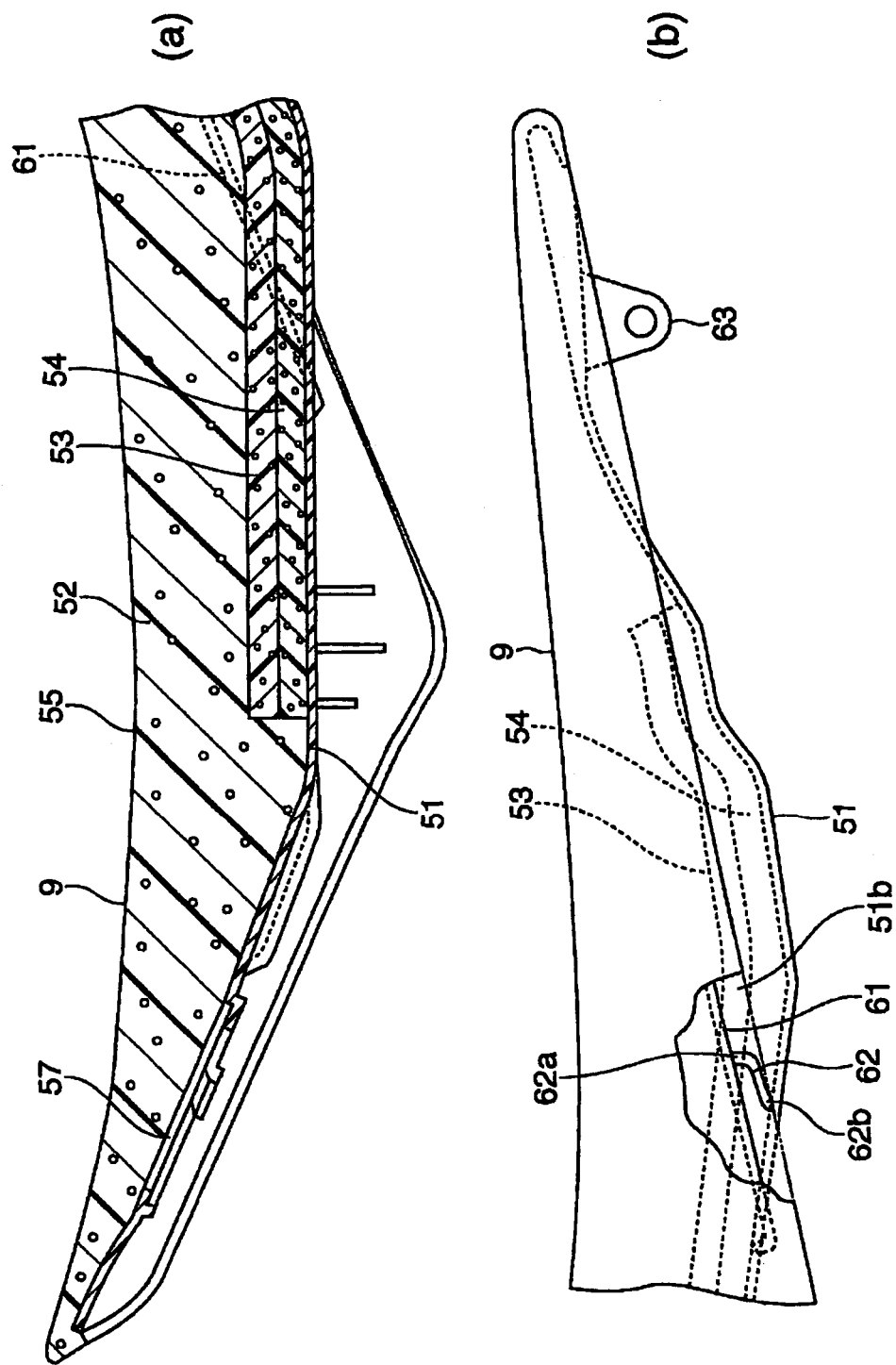
FIG. 8 (*a*) and (*b*) are views showing a seat, where FIG. 8(*a*) is a vertical sectional view of the front side part of the seat and FIG. 8(*b*) is a side view of the rear side part of the seat, the figures being drawn with a part, where engaging pieces are formed, cut away.

As shown in FIG. 8(a), the seat 9 includes a bottom plate 51 that is formed in a predetermined shape with plastics, three kinds of cushion materials 52 to 54 to be described later that are provided on this bottom plate 51, and a skin 55 that covers these cushion materials 52 to 54. In addition, as shown in FIG. 2, this seat 9 is formed so as to extend along the front-rear direction of the vehicle from a rear upper part of the fuel tank 8 to the rear fender 49 in the rear part of the vehicle. The front end of the seat 9 is supported by the fuel tank 8 and the center and the rear end thereof in the front-rear direction is supported by the rear frame 26.

Figure 9:
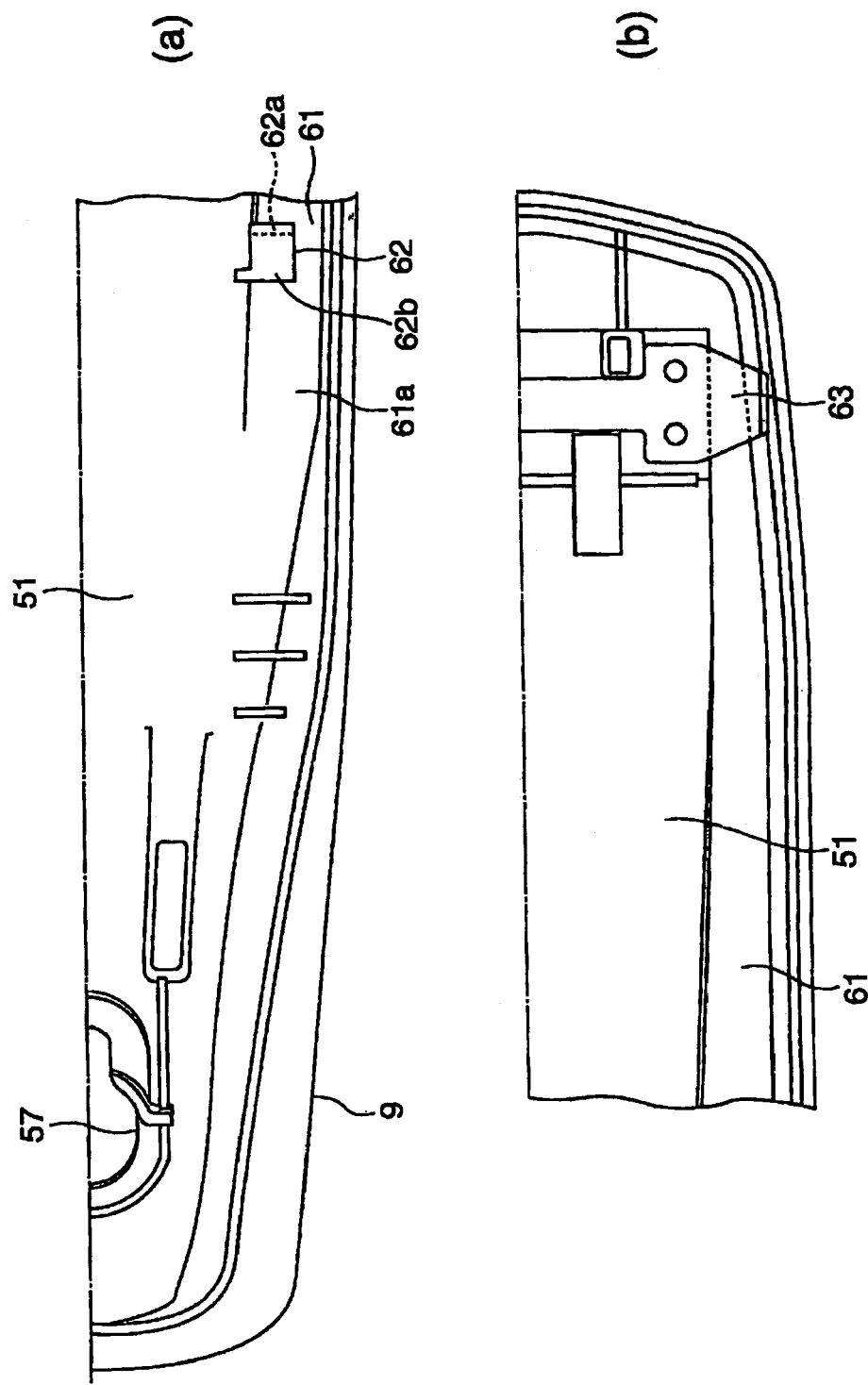
FIGS. 9 (*a*) and (*b*) are bottom views of the seat, where FIG. 9(*a*) shows the front of the seat and FIG. 9(*b*) shows the rear of the seat.

As is well known conventionally, a connection part of the front end of this seat 9 and the fuel tank 8 adopts a structure in which an engaging projection 58 (see FIG. 2) of a T shape in section of the fuel tank 8 is inserted into an engaging hole 57 (see FIGS. 8(a) and 9(a)), which is formed in the center of the bottom plate 51 in the width direction of the vehicle, and engaged with the engaging hole 57. In addition, a connection part of the center of the seat 9 in the front-rear direction of the vehicle and the rear frame 26 adopts a structure in which movably supported plates 61 (see FIG. 10) integrally formed at both the ends in the width direction of the bottom plate 51 comes into abutment against the upper end face of the locking pieces 35 and are movably supported by the locking pieces 35.

Figure 10:
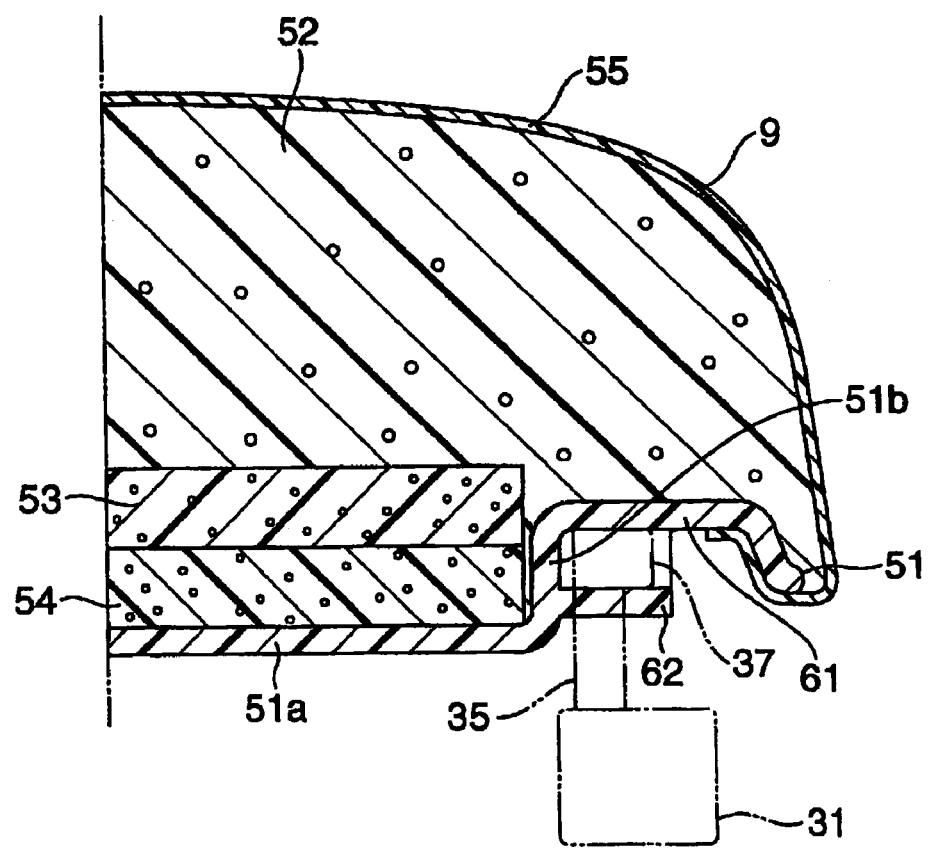
FIG. 10 is a sectional view along line X-X of the seat in FIG. 2.
Figure 11:
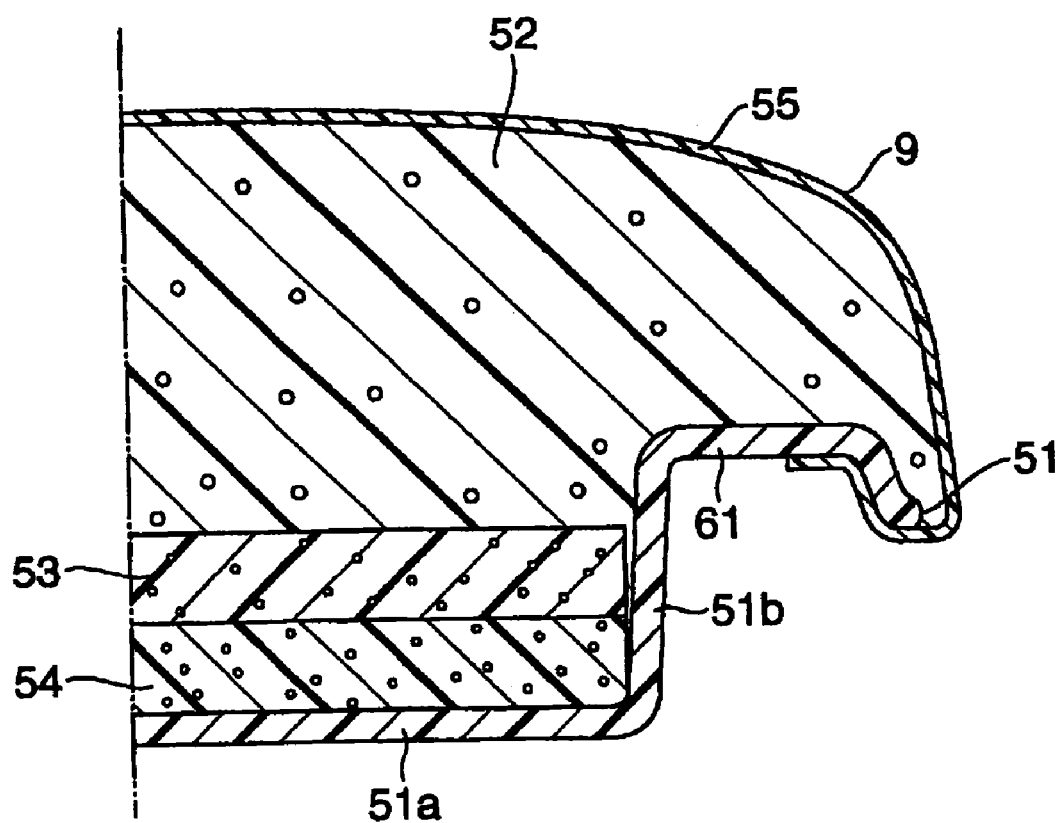
FIG. 11 is a sectional view along line XI-XI of the seat in FIG. 2.

As shown in FIGS. 10 and 11, the movably supported plates 61 are formed such that a rear portion from substantially the center in the front-rear direction at both the ends of the bottom plate 51 in the width direction of the vehicle is partially deviated upward. Note that a sectional shape of a portion of the bottom plate 51 further a head of the front ends 61a of the movably supported plates 61 (see FIG. 9(a)) is formed in a C shape opened downward. In addition, as shown in FIGS. 2, 8(b), and 10, engaging pieces 62, which project to the outside of the vehicle, are formed on vertical walls extending downward from the ends on the vehicle inner side of the movably supported plates 61, in other words, on vertical walls 51b that connect a flat portion 51a extending in the front-rear direction and the movably supported plates 61 in the center of the bottom plate 51 in the width direction of the vehicle.

The engaging pieces 62 are formed by extending portions 62a that extend downward from the movably supported plates 61 and the other extending portions 62b that extend forward from the lower end of this extending portion 62a. In a state in which the seat 9 is mounted on the vehicle, the other extending portions 62b are located below the rear ends 37a (engaging pawls) of the pressure receiving plates 37 provided in the engaging pieces 35, and the pressure receiving plates 37 are nipped by the other extending portions 62b and the movably supported plates 61.

Figure 12:
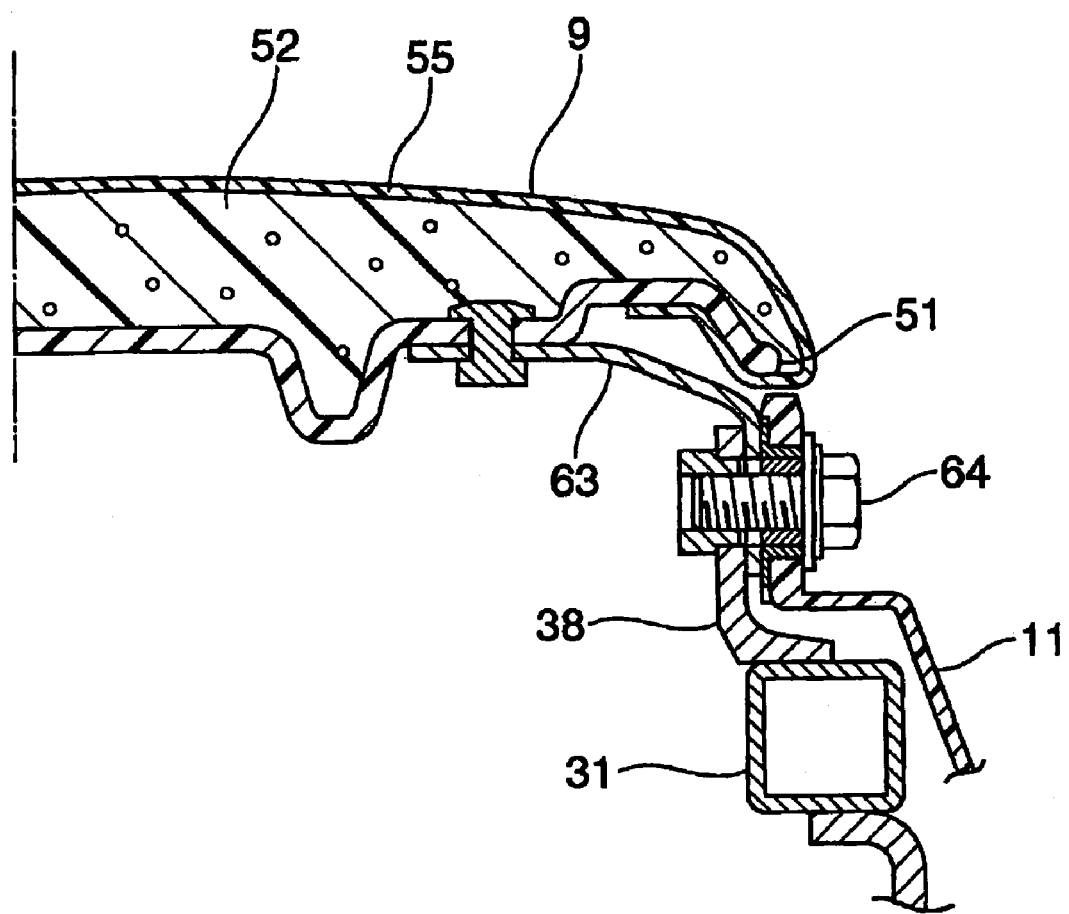
FIG. 12 is a sectional view along line XII-XII in FIG. 2.

As shown in FIG. 12, a connection part of the rear end of the seat 9 and the rear frame 26 adopts a structure in which a supporting plate 63 fixed to the bottom plate 51 is fixed by the bracket 38 at the rear ends of the seat rails 31 by a fixing bolt 64. In addition, a rear end of the side cover 11 is also fastened to this connection part by the fixing bolt 64.

A cushion material of the seat 9 includes the cushion material 52 on the seat surface side, which is provided in an entire area of a formation range of the seat 9 and covered by the skin 55, and the inner cushion materials 53 and 54, which are provided to be stacked one on another on the flat portion 51a of the bottom plate 51 so as to be located between the pair of left and right movably supported plates 61.

The cushion material 52 on the seat surface side is formed of a material equivalent to that used in the conventional seat. As an example of the material forming the cushion material 52 on the seat surface side, there is urethane foam. The cushion material 52 on the seat surface side according to this embodiment is formed so as to be smaller in thickness than the conventional cushion material because the inner cushion materials 53 and 54 are provided as described later.

The inner cushion materials 53 and 54 are stacked one on another so as to form a tabular shape in layers. The inner cushion material 53 on the upper side is disposed on the inner cushion material 54 on the lower side. In addition, these inner cushion materials 53 and 54 are formed of materials harder than the cushion material 52 on the seat surface side, that is, each having a larger damping force against impact. To describe more in detail, the inner cushion materials 53 and 54 according to this embodiment are formed of materials harder than the cushion material 52 on the seat surface side and softer than the bottom plate 51 such that the inner cushion material 54 on the lower side is relatively harder than the inner cushion material 53 on the upper side. As a material forming the inner cushion materials 53 and 54, micro-cell urethane foam (product name: polon) is used in this embodiment. In order to change the hardness, the density of air holes formed in the inside at the time of formation is changed.

In order to attach the seat 9 constituted as described above to the rear frame 26, first, the engaging projection 58 of the fuel tank 8 is inserted into the engaging hole 57 of the bottom plate 51, the movably supported plates 61 of the bottom plate 51 are movably supported by the engaging pieces 35 of the rear frame 26, and the seat 9 is translated forward. By moving the seat 9 in this way, the engaging projection 58 engages with the engaging hole 57 and, at the same time, the pressure receiving plates 37 of the locking pieces 35 engage with the engaging pieces 62 of the bottom plate 51. Thereafter, the supporting plate 63 at the rear end of the seat 9 is fixed to the bracket 38 at the rear ends of the seat rails 31 by the fixing bolt 64, whereby attachment work of the seat 9 ends.

According to the supporting structure for the seat 9, the bottom plate 51 of the seat 9 is never displaced in a height direction because both the ends of the bottom plate 51 in the width direction of the vehicle are movably supported by the engaging pieces 35 of the rear frame 26. Thus, even in the case in which the weight of a rider is applied to the seat 9 as an impact load, a portion between both the ends is simply deformed elastically to curve downward viewed from the front-rear direction of the vehicle.

Consequently, whereas, in the conventional seat supporting structure, the leg provided on the bottom plate of the seat is movably supported by the rear frame and inclines due to the impact load, whereby the bottom plate itself is lowered, according to the above-mentioned structure, this does not occur, and an amount of downward deformation of the bottom plate 51 can be reduced.

In addition, since the inner cushion materials 53 and 54 harder than the cushion material 52 on the seat surface side are provided on the seat 9, for example, when the rider is seated to apply an impact load to the seat 9, the rider sits on the inner cushion materials 53 and 54 via the cushion material 52 on the seat surface side, and an impact, which cannot be eased by the cushion material 52 on the seat surface side, is eased by the inner cushion materials 53 and 54. Consequently, despite the fact that the amount of deformation of the bottom plate 51 of the seat 9 is reduced and it becomes difficult to ease the impact with elasticity of the bottom plate 51, the rider is not given a feeling unpleasant when the rider hits the bottom plate 51 of the seat 9 when the rider is seated. Moreover, riding comfort is not damaged even if the seat 9 is formed to have a reduced thickness.

As a result, the seat 9 can be formed so as to bend less easily and have a reduced thickness, and the battery 19 can be mounted in the vicinity below the seat 19 in a state in which the battery 19 is not brought into contact with the bottom plate 51.

Moreover, according to the seat supporting structure described above, the pressure receiving plates 37, which project backward from the upper ends of the engaging pieces 35 of the rear frame 26, are provided, and the engaging pieces 62, which face the lower part of this pressure receiving plate 37 and engage with these pressure receiving plates 37, are provided on the bottom plate 51 of the seat 9. Thus, when a force of pulling the sides of the seat 9 upward is applied to the sides of the seat 9 by the legs of the rider during running, this force is transmitted to the rear frame 26 via the engaging parts of the pressure receiving plates 37 and the engaging pieces 62. In other words, it is possible to fix the seat 9 firmly to the rear frame 26.

In addition, the inner cushion materials 53 and 54 are formed by stacking plural cushion materials different in hardness one on another in layers such that the inner cushion material 54 on the lower side closer to the bottom plate 51 is relatively harder than the inner cushion material 53 on the upper side. Thus, when an impact applied by the rider to the seat when he sits on the seat 9 is relatively small, a larger amount of impact is damped by the cushion material closer to the surface of the seat 9, and when the impact is relatively large, the impact is also damped by the cushion material closer to the bottom plate 51 of the seat 1. Consequently, it is possible to generate a damping force in the seat 9 50 as to correspond to a magnitude of the force applied by the rider when he sits on the seat 9.

In the embodiment described above, the example in which the inner cushion material includes the inner cushion material 53 on the upper side and the inner cushion material 54 on the lower side is described. However, the inner cushion material may be one, or three or more inner cushion materials can also be used. In addition, the vehicle may be a motor three wheel or four wheel car.

The invention claimed is:

1. A seat supporting structure in a motorcycle, comprising:
    projecting pieces for receiving a load are provided in sections corresponding to both ends of a seat in a rear frame so as to project upward;
    a bottom-plate of the seat includes:
    a flat portion that constitutes a center of the bottom plate in a width direction of the motorcycle and extends in a front-rear direction;
    movably supported plates that are formed at both ends of the bottom plate in the width direction of the motorcycle, which are sections opposed to the projecting pieces, positioned above the flat portion and movably supported by the projecting pieces; and
    vertical walls that connect ends of the flat portion in the width direction of the motorcycle and ends on inner sides of the motorcycle of the movably supported plates; and
    inner cushion materials harder than a cushion material on a seat surface side are provided on the flat portion so as to be located between both the movably supported plates and between both the vertical walls.

2. The seat supporting structure according to claim 1, wherein engaging pawls projecting to a rear of the motorcycle are provided at upper ends of the projecting pieces and engaging pieces, which face a lower part of the engaging pawls and engage with the engaging pawls, are provided in the bottom plate of the seat.

3. The seat supporting structure according to claim 1, wherein the inner cushion materials are formed by putting cushion materials different in hardness one on another in layers such that the cushion materials closer to the bottom plate are harder.

4. The seat supporting structure according to claim 1, wherein the seat extends in the front-rear direction of the motorcycle.

5. The seat supporting structure according to claim 1, wherein both ends of the seat in the width direction of the motorcycle are movably supported by the rear frame.

6. The seat supporting structure according to claim 1, wherein the rear frame is connected to a main pipe via a bracket.

7. The seat supporting structure according to claim 1, wherein the rear frame includes a pair of left and right seat rails.

8. The seat supporting structure according to claim 7, wherein the projecting pieces are welded to the seat rails.

9. The seat supporting structure according to claim 1, wherein the bottom plate is made of plastic.

10. The seat supporting structure according to claim 1, wherein a skin material covers the cushion materials.

11. A seat supporting structure motorcycle, comprising:
    means for receiving a load are provided in sections corresponding to both ends of a seat in a rear frame so as to project upward;
    a bottom-plate of the seat includes:
    a flat portion that constitutes a center of the bottom plate in a width direction of the motorcycle and extends in a front-rear direction;
    movably supported plates that are formed at both ends of the bottom plate in the width direction of the motorcycle, which are sections opposed to the means for receiving, positioned above the flat portion and movably supported by the means for receiving; and vertical walls that connect ends of the flat portion in the width direction of the motorcycle and ends on inner sides of the motorcycle of the movably supported plates; and inner cushion materials harder than a cushion material on a seat surface side are provided on the flat portion so as to be located between both the movably supported plates and between both the vertical walls.

12. The seat supporting structure according to claim 11, wherein engaging pawls projecting to a rear of the motorcycle are provided at upper ends of the means for receiving and engaging pieces, which face a lower part of the engaging pawls and engage with the engaging pawls, are provided in the bottom plate of the seat.

13. The seat supporting structure according to claim 11, wherein the inner cushion materials are formed by putting cushion materials different in hardness one on another in layers such that the cushion materials closer to the bottom plate are harder.

14. The seat supporting structure according to claim 11, wherein the seat extends in the front-rear direction of the motorcycle.

15. The seat supporting structure according to claim 11, wherein both ends of the seat in the width direction of the vehicle are movably supported by the rear frame.

16. The seat supporting structure according to claim 11, wherein the rear frame is connected to a main pipe via a bracket.

17. The seat supporting structure according to claim 11, wherein the rear frame includes a pair of left and right seat rails.

18. The seat supporting structure according to claim 17, wherein the means for receiving are welded to the seat rails.

19. The seat supporting structure according to claim 11, wherein the bottom plate is made of plastic.

20. A method for manufacturing a seat supporting structure in a motorcycle, comprising:

receiving a load by projecting pieces provided in sections corresponding to both ends of a seat in a rear frame so as to project upward;

providing a bottom-plate of the seat having a flat portion that constitutes a center of the bottom plate in a width direction of the motorcycle and extends in a front-rear direction;

forming movably supported plates at both ends of the bottom plate in the width direction of the motorcycle, which are sections opposed to the projecting pieces, positioned above the flat portion and movably supported by the projecting pieces;

connecting ends of the flat portion in the width direction of the motorcycle and ends on inner sides of the motorcycle of the movably supported plates with vertical walls; and providing inner cushion materials harder than a cushion material on a seat surface side on the flat portion so as to be located between both the movably supported plates and between both the vertical walls.

* * * * *